US008973885B2

(12) United States Patent
Bonnet et al.

(10) Patent No.: US 8,973,885 B2
(45) Date of Patent: Mar. 10, 2015

(54) STRUCTURAL ROD INCORPORATING A VIBRATION FILTRATION MODE

(75) Inventors: Mathieu Bonnet, Toulouse (FR); Frederic Journade, Toulouse (FR); Laurent Lafont, Pechbusque (FR); Benoit Valery, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 209 days.

(21) Appl. No.: 12/915,736

(22) Filed: Oct. 29, 2010

(65) Prior Publication Data

US 2011/0210229 A1 Sep. 1, 2011

(30) Foreign Application Priority Data

Nov. 2, 2009 (FR) ...................... 09 57743

(51) Int. Cl.
*F16M 13/00* (2006.01)
*B64D 27/00* (2006.01)
*F16C 7/04* (2006.01)

(52) U.S. Cl.
CPC ....................... *F16C 7/04* (2013.01)
USPC ........... 248/557; 248/554; 248/638; 248/599; 248/158; 248/160; 248/555; 248/556; 248/639; 248/603; 248/608; 244/54; 244/55; 403/2

(58) Field of Classification Search
USPC ......... 248/557, 554, 638, 599, 622, 158, 160, 248/555, 556, 639, 580, 603, 608–609; 244/54, 55; 403/2
See application file for complete search history.

(56) References Cited

U.S. PATENT DOCUMENTS

| 4,549,850 | A | | 10/1985 | Vincent |
| 4,786,202 | A | * | 11/1988 | Arnold et al. .................... 403/79 |
| 5,275,357 | A | * | 1/1994 | Seelen et al. .................... 244/54 |
| 6,330,995 | B1 | * | 12/2001 | Mangeiga et al. ............ 248/554 |
| 7,021,585 | B2 | * | 4/2006 | Loewenstein et al. .......... 244/54 |
| 7,445,179 | B2 | * | 11/2008 | Diochon et al. ................ 244/54 |
| 2005/0051228 | A1 | | 3/2005 | Bruske et al. |
| 2007/0069068 | A1 | * | 3/2007 | Lafont et al. .................... 244/54 |

FOREIGN PATENT DOCUMENTS

| FR | 2599793 A1 * | 12/1987 | ............. B64C 13/30 |
| FR | 2677723 A1 | 12/1992 | |
| FR | 2889272 A1 | 2/2007 | |

OTHER PUBLICATIONS

French Search Report and Written opinion dated Jun. 24, 2010.

* cited by examiner

*Primary Examiner* — Terrell McKinnon
*Assistant Examiner* — Christopher Garft
(74) *Attorney, Agent, or Firm* — Dickinson Wright PLLC

(57) ABSTRACT

A structural rod has a primary rod that has an axial cavity and a secondary rod inside the axial cavity so that the secondary rod is able to move inside the axial cavity along the direction of the longitudinal axis of the rod. The primary rod has a bearing for fastening the structural rod at the first end in a rigid manner and is not fastened rigidly to the structure at the second end. Conversely, the secondary rod has a bearing for fastening the structural rod at the second end in a rigid manner and is not fastened rigidly to the structure at the first end. The primary and secondary rods are joined through one or more intermediate linkage elements made of a deformable and elastic material.

7 Claims, 2 Drawing Sheets

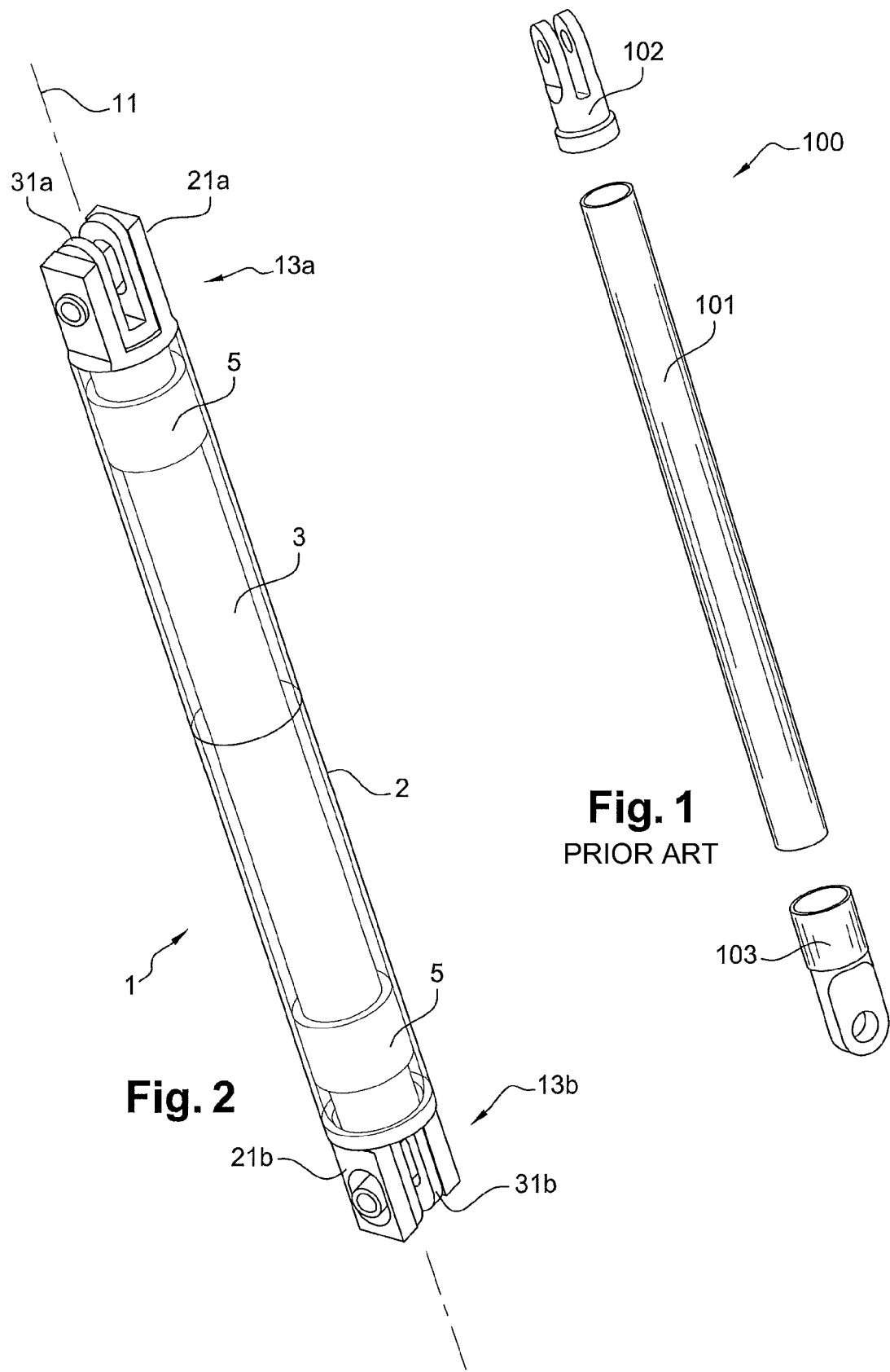

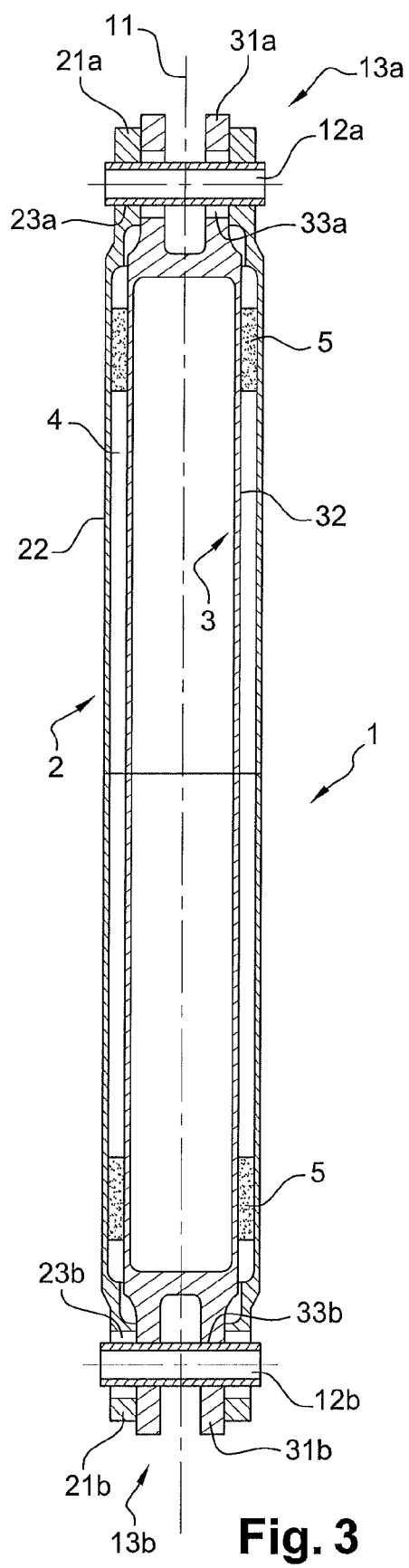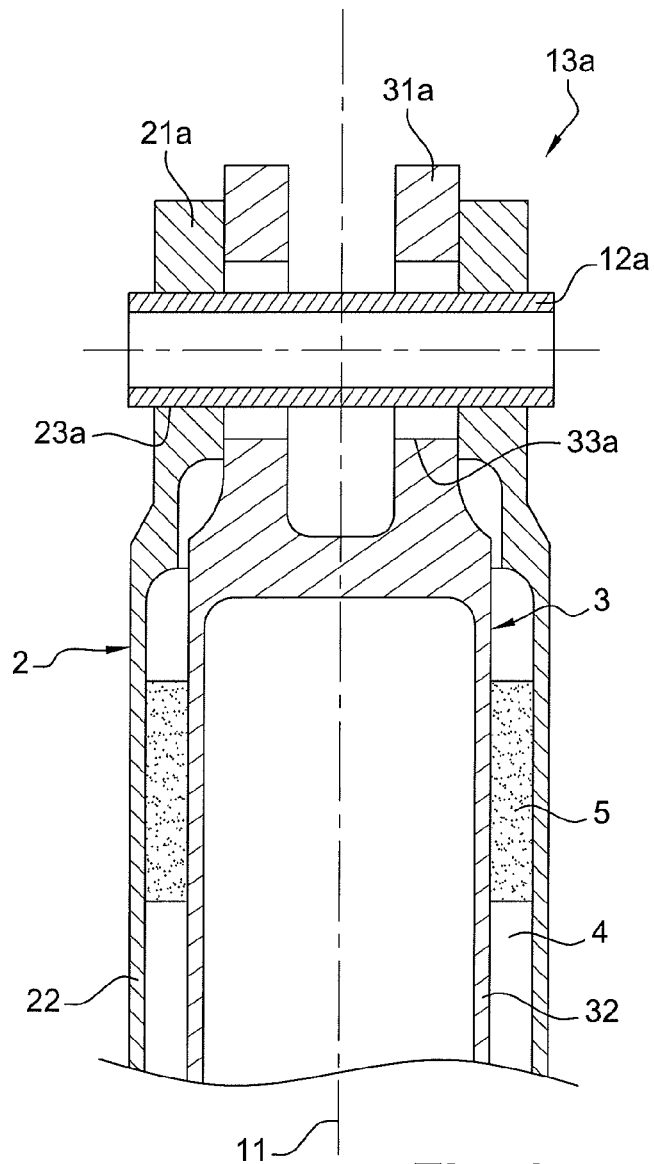

STRUCTURAL ROD INCORPORATING A VIBRATION FILTRATION MODE

CROSS-REFERENCE TO RELATED APPLICATIONS

This application claims priority to and the benefit of French Application No. 09 57743 filed on 2 Nov. 2009, the disclosures of which are incorporated by reference in its entirety.

BACKGROUND

The disclosed embodiments relate to the field of structural rods.

More particularly the disclosed embodiments relate to a structural rod for the transmission of forces that is able to filter vibrations and that tolerates a failure of the structure of the rod.

In the field of mechanics, it is known how to use rods for numerous applications as mechanical linkage elements.

Although diverse applications: control rods, crank rods, anti-crash rods, reinforcing rods for floor or casing structures, engine force pickup rods, etc., rods in general are intended to pick up and transmit forces, essentially tensile and compressive forces between two points of a structure.

A structural rod such as the rod 100 shown exploded in FIG. 1 accordingly has essentially a rod body 101, generally cylindrical, and a fastening bearing 102, 103 at each end of the body, by which the rod is fastened to structural elements or to articles of equipment at the points for force absorption. Numerous embodiments of such rods exist.

The rod can be made, as shown in FIG. 1, with end bearings added to the rod by welding or cementing, for example, depending on the materials used.

The rod can also be made in one part, with the bearing being integrated in the body.

However, the different existing rods on the one hand are rigid in construction to transmit the forces expected with the minimum deformation, and on the other hand are no longer able to transmit the forces in case of the breakage of a part of the structure of the rod, of the body or of a bearing. In some applications these characteristics of rods are not satisfactory.

Thus in the transmission of forces in a significant vibrating environment, for example in the case of aircraft engine installations, the rigid rods have the fault of transmitting vibrations, and when they have to be attenuated, it is suitable to adjoin vibration-filtering elements in the mounting of the rod, such as elastomeric collars called "silent-bloc" at the points of juncture with the structure.

However, such added filtering elements prove to be insufficient and are the sources of problems of maintenance and require making compromises that are often difficult between the rigidity of fastening and their ability to filter vibrations.

In the case in which there is the risk of the rod breaking has to be taken into consideration, it is then necessary to provide multiple possible pathways for the forces by multiplying the number of rods, which is not without its consequences on the complexity of the installation, on weight, and on costs.

SUMMARY

The disclosed embodiments have precisely the objective of solving these faults of the known structural rods by proposing a structural rod capable of filtering vibrations and of assuring the structural linkage in case of failure, pursuing a design that is tolerant of failures, called a "fail safe" design.

To do this, the structural rod of the disclosed embodiments, intended to transmit tensile and/or compressive forces between two fastening points of the rod on a structure or on an article of equipment, in a known way has bearings for fastening at each end, a first end and a second end along a longitudinal axis of the structural rod.

The structural rod of the disclosed embodiments is distinguished principally from the known structural rods in that it has a primary rod that has an axial cavity, and a secondary rod inside said axial cavity so that said secondary rod is able to move in the axial cavity of the primary rod along the direction of the longitudinal axis, with the secondary rod being joined to the primary rod through at least one linkage element.

Also, the primary rod has a bearing for fastening the structural rod at its first end in a rigid manner along the direction of the axis of the rod, to a structure or to an article of equipment when the rod is fastened to this structure or to this equipment;

the secondary rod has a bearing for fastening the structural rod at the second end in a rigid manner along the direction of the axis of the rod to a structure or to an article of equipment when the rod is fastened to this structure or to this equipment;

the primary rod lacks a rigid link along the direction of the axis of the rod to the structure or to the article of equipment to which the second end of the structural rod is fastened when the rod is fastened to this structure or to this equipment;

the secondary rod lacks a rigid link along the direction of the axis of the rod to the structure or to the article of equipment to which the first end of the structural rod is fastened when the rod is fastened to this structure or to this equipment;

the linking element(s) is/are made of a deformable and elastic material.

In order to filter effectively the vibrations to which the structural rod is subjected in use, the linking element(s) has/have a stiffness capable of filtering these vibrations between the two ends of the structural rod, in other words for the given ranges of frequency and amplitude.

To assure a strong mechanical linkage of the intermediary elements to the primary and secondary rods, the linking element(s) advantageously has/have toroidal shapes occupying a portion of the space between the inside surface of the principal hollow rod and the outside surface of the secondary rod, with the linkage element(s) being joined to the inside surface of the principal rod and the outside surface of the secondary rod.

The toroidal shape, in particular of a torus with rectangular cross section, permits making joints over a large area between an intermediate element and each rod, primary and secondary, to obtain the desired mechanical strength.

Because of their properties, especially their mechanical properties, but also because of their behavior in the presence of thermal environments and corrosive chemicals, the deformable and elastic material of the linking element(s) is an elastomer such as an elastomer used in the flexible linkage elements of the "silent bloc" type.

In a preferred embodiment of the structural strut, the primary strut at the second end of said structural rod, and/or the secondary rod at the first end of the structural rod, has/have a bearing whose bore size for the passage of a fastening pin for the rod, or of a collar for a pin to pass through, is greater in the direction of the axis of the rod than the diameter of the pin or of the collar.

Thus, for each rod, primary or secondary, only one of the ends absorbs the tensile or compressive forces up to a value of such tension or compressive force such that the displacement along the principal axis leads to a relative displacement of the primary and secondary rods permitted by the elasticity of the linkage elements so that the fastening pin or collar comes to rest on the edge of at least one of the openings of the bearing of the other end that has a slackness and permits the transmission of the forces rigidly without increasing the constraint in the linkage elements.

To give the structural rod an ability to tolerate damage, the primary and secondary rods have a bearing at each end of the rod and are each of such a structural size as to absorb the forces to be taken up by the structural rod so that the structural rod is able to absorb the total of the anticipated tensile or compressive forces in case of a fault of one of the rods, primary or secondary.

To take into account an average demand on the rod in use that is not necessarily zero and to present an optimal range of filtration of vibrations in this case, the fastening pin or the collar is in a median position along the longitudinal direction of the structural rod, in the bore with dimensions in the axial direction greater than the diameter of said fastening pin, or of said collar, for a non-zero predetermined tension or compression on said structural rod.

In a preferred application, the structural rod of the invention is intended to transmit forces between an engine and an aircraft structure.

BRIEF DESCRIPTION OF THE DRAWINGS

The description of an embodiment of the invention is given with reference to the figures, which show:

FIG. 1: already cited, an exploded view of an example of a rod according to the prior art;

FIG. 2: a perspective view of a rod pursuant to the invention, partially uncovered;

FIG. 3: a longitudinal cross section of the rod according to FIG. 2;

FIG. 4: a cross section of a detail of the first end of the rod of FIGS. 2 and 3.

DETAILED DESCRIPTION

A structural rod 1 pursuant to the invention, illustrated in FIG. 2, has a first rod or primary rod 2 and a second rod or secondary rod 3.

The structural rod 1 has a principal axis 11 corresponding to the direction of force absorption in tension or compression by said structural rod, which is also a principal axis of each of the rods, primary 2 and secondary 3.

As illustrated in FIG. 2 and FIG. 3, each primary and secondary rod has end bearings 21a and 21b for the primary rod 2, and 31a and 31b for the secondary rod 3.

In the structural rod 1, the secondary rod 3 is arranged in a hollow space in the primary rod 2, called the axial cavity, and the bearings of the two rods, primary and secondary, located at the same end of the rod, 21a, and 31a for a first end 13a, and 21b and 31b for a second end 13b, are positioned to be traversed by the same fastening pin 12a or 12b, when the rod 1 is assembled on a structure (not shown).

In this arrangement the rod 1 has the general appearance of a conventional rod, at least from the outside, like that of FIG. 1, with which it is interchangeable provided it is made with compatible outside dimensions, in particular the inter-pin of the bearings and similar structural characteristics.

Between the end bearings of the primary rod 21a and 21b on the one hand and of the secondary rod 31a and 31b on the other hand, an internal cross section of a body 22 of the hollow principal rod 2 is perceptibly larger than an external cross section of a body 32 of the secondary rod 3, so that an interposed space 4 is left between an inside wall of the body 22 of the principal rod and an outside wall of the body 32 of the secondary rod.

In addition, the bearings 31a, 31b of the secondary rod 3 are arranged to slide freely over a predefined distance along the direction of the principal axis 11 of the structural rod relative to the bearings 21a, 21b of the principal rod 2.

Such a result is obtained with a bearing 21a, 21b of the secondary rod with an enveloping form cylindrical on the outside with genetratrices parallel to the axis 11 of the rod and a likewise cylindrical hollow interior form, also with genetratrices parallel to the axis 11 of the rod, for the bearing 31a or 31b of the primary rod, and whose respective cross sections permit the desire sliding.

As in the embodiment illustrated, the different sliding cylindrical forms preferably have circular cross sections, but this shape is not indispensable and other forms that permit the desired sliding are possible.

The sliding of the secondary rod 3 inside the hollow space in the primary rod 2 is limited in amplitude at each end of the structural rod 1 by the mounting of the fastening pins 12a, 12b on the bearings 21a and 31a, or 21b and 31b, and by the cross section of the openings in said bearings traversed by said fastening pins.

FIG. 4 illustrates a detail of the structural rod 1 at the first end 13a of said rod.

At this first end, a bore 23a in the bearing 21a of the primary rod 2 is adapted to the diameter of the fastening pin 12a to be inserted in the bearing, exactly as in the example illustrated, or to the inside diameter of a collar or of a cross-piece, not shown, inserted into the bore 23a of said bearing.

Also at this first end, a bore 33a in the bearing 31a of the secondary rod 3 has a diameter, or at least a dimension along the direction of relative sliding along the direction of the axis 11 of the primary and secondary rods, that is greater than the diameter of the fastening pin 12a by an amount corresponding to the desired amplitude of the sliding of the primary and secondary rods.

Thus, when the structural rod 1 is fastened to a structure at its first end 13a, said structural rod is joined rigidly along the axial direction 11 to the structure by the primary rod 2 at the bearing 21a of said primary rod, and is joined with a predetermined slackness along the axial direction 11 to the structure by the secondary rod 3 at the bearing 31a of said secondary rod.

The arrangement of bores intended to fasten the structural rod 1 to a structure at the second end 13b of said structural rod is similar to the arrangement of the first end with a reversal of roles between the primary and secondary rods.

At this second end the bearing 31b of the secondary rod 3 has a bore 33b adapted to the fastening pin 12b and the bearing 21b of the primary rod 2 has a bore 23b with a dimension, at least along the direction of the axis 11 of the rod, greater than the diameter of the fastening pin 12b.

Thus, when the structural rod 1 is fastened to a structure at its second end 13b, said structural rod is rigidly joined along the axial direction 11 to the structure by the secondary rod 3 at the bearing 31b of said secondary rod, and is joined to the structure by the primary rod 2 with a predetermined slackness, preferably of the same amplitude as at the first end, along the axial direction 11, at the bearing 21b of said primary rod.

At least one, two in the example illustrated in FIGS. 3 and 3, deformable and elastic linkage elements 5 are arranged in the interposed space 4.

The linkage element 5 is fastened to the inside wall of the primary rod 2 and to the outside wall of the secondary rod 3.

In one form of embodiment, the linkage element is made of an elastomeric material and has a toroidal shape.

The elastomeric material can be of any known type of material that has mechanical characteristics suitable for the particular case of the mechanical and environmental characteristics desired for the structural rod.

In one example of embodiment, the elastomeric material is a synthetic elastomer used in industry to product elastic assembly elements of the "silent bloc" type.

The structural rod 1 whose structure has just been described is able to transmit tensile and compressive forces along the axis 11 of the rod.

When an action is applied to one of the ends of the structural rod 11, for example the first end 13a, the forces are introduced into the primary rod 2 by the bearing 21a of said first end, and at least for a force less than a reference force Fref, no force is introduced into the secondary rod 3 because of the slackness in the bearing 31a of said secondary rod at this end.

The forces of reaction at the other end of the structural rod, the second end 13b in the example, are transmitted to the structure by the bearing 31b of said second end of the secondary rod 3, and no force is transmitted by the primary rod 2 because of the slackness of the bearing 21b of said primary rod at this end.

Between the two ends of the structural rod 1, the forces are transmitted from the primary rod 2 to the secondary rod 3 through the linkage element(s) 5, by shear stress in this case.

Because of the nature of the material of the linkage elements 5, the latter are deformed under the effect of the tensile or compressive forces on the structural rod, and when the forces have relatively rapid periodic variable components such as vibrational components, they thus provide for filtering of said vibrational components.

One skilled in the art is aware that the characteristics of the primary 2 and secondary 3 rods, as well as the characteristics of the linkage elements 5, are determined as a function of the use to which the structural rod 1 is to be put, in particular the forces to be transmitted by said structural rod under limiting and extreme load, as well as the vibrations that are to be filtered and their characteristics; amplitudes, intensities, and frequencies.

To this end, it should be noted that the principle of the invention permits numerous variations of the linkage elements 5 to act on the parameters of the structural rod 1, such as the stiffness, mechanical strength, inherent frequency, damping, etc.

These variations involve notably the elastomeric material used, whose inherent characteristics are a function of the composition of said material, the width of the intermediate space 5 that determines a thickness of the linkage elements 5, the lengths of the linkage elements 5 along the direction of the axis 11 of the rod, the number of linkage elements 5, etc.

In particular, a number of linkage elements 5 of at least two has the advantage on the one hand of assuring a progressive transfer of the forces from the principle rod 2 to the secondary rod 3, and on the other hand of retaining a portion of the function of filtration of vibrations in case of the failure of one of the linkage elements.

A sufficient number of linkage elements 5 also assures maintaining and guiding the secondary rod 3 during its relative displacement essentially along the same axis as that of the principal rod 2, which permits avoiding too precise a fit at the bearings of said two rods, primary and secondary, a fit that would be susceptible to leading to friction prejudicial to the frequency response of the structural rod and to a good service lifetime of the bearings.

When the tensile or compressive force to which the structural rod 1 is subjected is equal to or greater than the reference value Fref, the deformation of the intermediate elements 5 is equal to the slackness permitted by the unfitted openings of the bearings 31a, 21b, and the fastening pins 12a, 12b, are resting on said unfitted openings.

The structural rod 1 then behaves like a conventional rigid rod in tension or in compression, as the case may be.

This limitation of the amplitude of relative movement of the primary and secondary rods and the changeover to a rigid mode of operation of the structural rod 1, as the case may be, can be assured by only a single end of the structural rod, but in this case when the structural rod 1 operates in rigid mode, the aggregate of forces applied to said structural rod are transmitted by the single primary or secondary rod, depending on the case, whose end bearing that has slack is resting on the fastening pin 12a or 12b.

The structural rod 1 also has the characteristic of tolerating damage to one of the rods, principal 2 or secondary 3, with the rod not failing being able to absorb the forces to be supported by the structural rod because of structurally suitable dimensions.

For example in the case of breakage of the fitted bearing 21a of the primary rod 2 at the first end 13a of the structural rod, the primary rod 2 is not able to absorb forces.

In this case the fastening pin 12a comes to rest on the bearing 31a of the secondary rod 3, which absorbs the combined tensile and compressive forces applied to the structural rod 1 between its two end bearings 31a and 31b.

Also in the case of compressive force, the failed rod whose body is always joined to the body of the other rod participates in the resistance to buckling of the other rod, which absorbs the compressive forces.

In a particular mode of embodiment, the possible displacement of the pin 12a in the bearings that allow for slackness is not symmetrical with respect to the compressive and tensile forces, the central position of said pin or of said collar or crosspiece leading to a symmetry of possible displacement corresponding to a non-zero compressive or tensile force on the structural rod 1.

Such an arrangement is advantageous when the structural rod is subjected to a non-zero average tensile or compressive force in service, when this average force has a superimposed vibration whose filtering is desired.

As illustrated in the example of FIGS. 2, 3, and 4, the bearings are preferably fork bearings that have two cheeks arranged symmetrically relative to the axis of the rod 11.

This arrangement of the cheeks favors a symmetrical distribution of the loads into the structure of the rod, but other forms of bearings known in mechanical assemblies are nevertheless possible.

In the same way, the revolution forms of the rod and of its different principal components are shown only by way of non-limiting illustration of the forms that can be used and that would respect the functional constraints on the rod of the invention.

The primary 2 and secondary 3 rods are produced by conventional means by the technology for producing the known structural rods. In particular, the rods of the invention can be produced using metallic materials or composite materials.

Accordingly, the invention permits producing structural rods that can transmit major static forces while providing for filtration of the vibrations and being tolerant to damage.

The setting of the parameters of vibration filtration by the selection of the structural and dimensional characteristics of the intermediate elements 5 permits selection of a range of frequencies and amplitudes filtered by the structural rod, a range that corresponds, for example, to the vibrations that impact the fatigue aging of the structures to which the structural rod is to transmit forces, and/or the vibrations impacting the comfort of the persons who may be subjected to these vibrations and to an annoying acoustic environment by the structure.

In a particular application, the rods conforming to the invention are used to transmit thrust forces between the engines of an aircraft and the structure of said aircraft to which the engines are fastened.

For example, a structural rod pursuant to the invention, or a group of structural rods pursuant to the invention, is arranged between an engine and the structure of the aircraft, or is arranged between a support structure for an engine such as a support pylori and the structure of the aircraft, with such an arrangement being advantageous in the case of engines fastened to a rear section of the fuselage.

In this application, a structural rod is advantageously calculated and produced to transmit forces corresponding to the case of the cruising thrust of the engine and to filter the vibrations in this case, which at the same time is the case corresponding to the longest duration capable of causing fatigue damage to the surrounding structures and of transmitting vibrations and noise prejudicial to the comfort of the passengers or crew.

When the forces to be transmitted by the structural rod are more substantial, either because of an operating regime of the engine, for example for takeoff. or because of an engine fault causing an abnormal level of vibration, the amplitude of the motions filtered by the rod permitted by the intermediate elements is surpassed and the rod is designed to function in rigid mode.

The invention claimed is:

1. Structural rod configured to transmit tensile and/or compressive forces between two fastening pins for fastening the rod to a structure or to an article of equipment, said structural rod comprising:
   bearings for fastening at each end of the structural rod; and
   a first end and a second end arranged along a principal axis of said structural rod, wherein said structural rod includes:
      a primary rod having a first and second end, a secondary rod having a first and second end, an interposed space between an inside wall of the primary rod and an outside wide wall of the secondary rod, and at least one linkage element arranged in the interposed space, wherein
      said secondary rod is configured to move along the principal axis of the structural rod, and is joined to said primary rod through the at least one linkage element,
      the primary rod has a first bearing for fastening at its first end, with the first bearing of the primary rod being provided with a bore fitted to the dimensions of one of the fastening pins, and said structural rod is configured to be rigidly joined to said structure or equipment by said primary rod at said first bearing of said primary rod along the direction of the principal axis,
      the secondary rod has a second bearing for fastening at the second end of the secondary rod, with the second bearing of the secondary rod being provided with a bore fitted to the dimensions of the second of the fastening pins, and said structural rod is configured to be rigidly joined to said structure or article by said secondary rod at said second bearing of said secondary rod along the direction of the principal axis,
      the primary rod has a second bearing at the second end of the primary rod, with the second bearing at the second end of the primary rod being provided with a bore whose dimensions are greater along the direction of the principal axis of the rod than the dimensions of the second pin, and said structural rod is configured to be joined to said structure or article at said second bearing of said primary rod with a predetermined slackness along the direction of the principal axis,
      the secondary rod has a first bearing at the first end of the secondary rod, with the first bearing at the first end of the secondary rod being provided with a bore whose dimensions are greater along the direction of the principal axis of the rod than the dimensions of the first pin, and said structural rod is configured to be joined to said structure or article at said first bearing of said secondary rod with a predetermined slackness along the direction of the principal axis, and
      the at least one linkage element is made of a deformable and elastic material.

2. Structural rod pursuant to claim 1 in which the at least one linkage element has a stiffness suitable for filtering vibrations between the two ends of the structural rod for selectable ranges of frequency and amplitude.

3. Structural rod pursuant to claim 2 in which the at least one linkage element has a toroidal shape and is fastened to the inside wall of the principal rod and the outside wall of the secondary rod.

4. Structural rod pursuant to claim 3 in which the deformable and elastic material of the at least one linkage element is an elastomer.

5. Structural rod pursuant to claim 4 in which at least one of the rods, primary or secondary, that has a bearing at each end of the rod, has structural dimensions to absorb forces to be absorbed by the structural rod.

6. Structural rod pursuant to claim 5 in which the bores of the primary and secondary rods, fitted to the dimensions of their respective fastening pins are in a median position along the principal axis of the structural rod, relative to the respective bore, with dimensions along the principal axis being greater than the diameter of each bore's respective fastening pin, for a predetermined non-zero value of tension or compression on the structural rod.

7. Structural rod pursuant to claim 6 configured to transmit forces between an engine and an aircraft structure or between an engine support structure and an aircraft structure.

* * * * *